United States Patent
Hilbert et al.

(10) Patent No.: US 9,956,561 B2
(45) Date of Patent: May 1, 2018

(54) METHOD FOR PRODUCING BASIC PRODUCTS FROM ASH, IN PARTICULAR PAPER ASH

(71) Applicant: UPM-KYMMENE CORPORATION, Helsinki (FI)

(72) Inventors: Heiko Hilbert, Kaufbeuren (DE); Michael Heberle, Schongau (DE); Hendrik Krois, Schongau (DE); Klaus Muller-Gommert, Augsburg (DE); Folke Orsa, Lappeenranta (FI); Johann Oberndorfer, Puchheim (DE); Meri Ventola, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 76 days.

(21) Appl. No.: 14/431,274

(22) PCT Filed: Sep. 25, 2013

(86) PCT No.: PCT/EP2013/069948
§ 371 (c)(1),
(2) Date: Mar. 25, 2015

(87) PCT Pub. No.: WO2014/048979
PCT Pub. Date: Apr. 3, 2014

(65) Prior Publication Data
US 2015/0274978 A1   Oct. 1, 2015

(30) Foreign Application Priority Data

Sep. 25, 2012  (DE) .................. 10 2012 217 305

(51) Int. Cl.
*B02C 19/18*      (2006.01)
*C09C 1/40*       (2006.01)
(Continued)

(52) U.S. Cl.
CPC ........... *B02C 19/18* (2013.01); *B01J 20/3021* (2013.01); *B03B 7/00* (2013.01); *B07B 15/00* (2013.01);
(Continued)

(58) Field of Classification Search
USPC ...................................... 241/30, 20
See application file for complete search history.

(56) References Cited

U.S. PATENT DOCUMENTS

| 1,552,973 A | 9/1925 | Walton |
| 3,765,921 A | 10/1973 | Puskar |

(Continued)

FOREIGN PATENT DOCUMENTS

| CN | 1705516 A | 12/2005 |
| CN | 101433876 A | 5/2009 |

(Continued)

OTHER PUBLICATIONS

International Preliminary Report on Patentability dated Dec. 1, 2014 re: Application No. PCT/EP2013/069948; pp. 10; citing: US 2009/194615 A1, US 1 552 973 A, US 2009/312549 A1, US 3 765 921 A, US 5 407 140 A, DE 102 59 456 A1 and US 2011/152430.

(Continued)

*Primary Examiner* — Faye Francis
(74) *Attorney, Agent, or Firm* — Cantor Colburn LLP

(57) ABSTRACT

A method for producing basic products from ash, which includes the provision of a starting material in particle form, crushing the particles of the starting material by high-frequency pressure impulses and the in situ separation of at least two fractions with different average particle sizes, where the energy-efficient production of a basic product with a defined particle size and high reactivity is effected, such that the produced basic products can be used directly for (Continued)

further product production, e.g. as alkalizing agent, for ground stabilization or as filler.

12 Claims, 2 Drawing Sheets

(51) Int. Cl.

| | | |
|---|---|---|
| *C09C 3/04* | (2006.01) | |
| *C09C 1/00* | (2006.01) | |
| *C09C 1/02* | (2006.01) | |
| *C09C 1/30* | (2006.01) | |
| *D21H 17/63* | (2006.01) | |
| *C05D 3/02* | (2006.01) | |
| *C05D 9/00* | (2006.01) | |
| *B82Y 30/00* | (2011.01) | |
| *B01J 20/30* | (2006.01) | |
| *B03B 7/00* | (2006.01) | |
| *B07B 15/00* | (2006.01) | |

(52) U.S. Cl.
CPC ............... *B82Y 30/00* (2013.01); *C05D 3/02* (2013.01); *C05D 9/00* (2013.01); *C09C 1/00* (2013.01); *C09C 1/02* (2013.01); *C09C 1/3018* (2013.01); *C09C 1/40* (2013.01); *C09C 3/041* (2013.01); *D21H 17/63* (2013.01); *B02C 2019/183* (2013.01); *C01P 2004/62* (2013.01); *C01P 2004/64* (2013.01)

(56) References Cited

U.S. PATENT DOCUMENTS

| | | |
|---|---|---|
| 5,407,140 A | 4/1995 | Lofthouse et al. |
| 5,690,897 A | 11/1997 | Drummond |
| 5,714,299 A | 2/1998 | Combes et al. |
| 2009/0194615 A1 | 8/2009 | Schuessler |
| 2009/0312459 A1 | 12/2009 | Gane et al. |
| 2011/0094412 A1 | 4/2011 | Proells et al. |
| 2011/0143067 A1 | 6/2011 | Hoelter et al. |
| 2011/0152430 A1 | 6/2011 | Sauerwein et al. |
| 2012/0077917 A1 | 3/2012 | Gane et al. |

FOREIGN PATENT DOCUMENTS

| | | |
|---|---|---|
| DE | 10259456 A1 | 7/2004 |
| DE | 102005029500 A1 | 12/2006 |
| WO | 9107223 A1 | 5/1991 |

OTHER PUBLICATIONS

International Preliminary Report on Patentability dated Dec. 1, 2014 re: Application No. PCT/EP2013/069949; pp. 11; citing: US 2011/152430 A1, US 2011/143067 A1; US 2011/094412 A1, US 3 765 921 A, DE 102 59 456 A1, US 5 690 897 A and US 5 714 299 A.
International Search Report dated Mar. 12, 2014 re: Application No. PCT/EP2013/069948; citing: US 2009/194615 A1, US 1 552 973 A, US 2009/312459 A1 and US 3 765 921 A.
International Search Report dated Mar. 12, 2014 re: Application No. PCT/EP2013/069949; citing: US 2011/152430 A1, US 2011/143067 A1, US 2011/094412 A1, US 3 765 921 A, DE 102 59 456 A1, US 5 690 897 A and US 5 714 299 A.

METHOD FOR PRODUCING BASIC PRODUCTS FROM ASH, IN PARTICULAR PAPER ASH

TECHNICAL FIELD

The present invention relates to a method for producing basic products from ash, in particular paper ash. The basic products can be used as alkalizing agent (soda lye substitute), as adsorption agent, for ground stabilization or as filler. In particular, the method relates to the energy-efficient recycling and defined modification of industrial ashes and incineration ashes for further product production.

BACKGROUND

Substances such as industrial ashes and incineration ashes have so far been passed on mainly as waste for utilization primarily to the building and cement industries.

Owing to the material property of starting materials such as ashes, which have a large proportion of important components such as CaO, MgO, $Al_2O_3$ and $Na_2O$, the recycling of waste products to basic products that can be reintroduced into industrial processes e.g. in paper and wood processing or in ground stabilization is of economic and ecological interest.

DE 10 2005 029500 A describes that by the indirect use of the high alkali and alkaline earth oxide contents a substitution of soda lye by recycled ash as alkalizing agent is used in paper recycling and in wood pulp bleaching.

Conventional methods have so far been used for recycling starting materials such as ashes, in particular milling in a wet process with conventional milling machines such as ball mills. In the conventional wet milling methods, however, technical problems and high downtime often arise, which are caused by the abrasive wear of the milling tools or blockings of the plant. A further problem of wet milling is that the process takes place under atmospheric conditions and a reaction takes places directly during milling. With the conventional milling machines, however, dry processes cannot be used owing to cakings and blockings in the milling machines, although the dry process would be better by far for the use of the basic products e.g. in order to be able to avoid subsequent drying processes.

Moreover, it has been found that in the conventional methods, a defined particle size and a high reactivity of the basic products cannot be reached or can only be reached with a high expenditure of energy. Therefore, the recycling of starting materials such as industrial ashes and incineration ashes has been uneconomic so far due to the high amount of energy required.

Furthermore, basic products produced with conventional methods tend to agglomerate and form aggregates, which results in that no defined particle size is reached, the basic products have a low reactivity and consequently, due to the low quality, can only be reintroduced into industrial processes to a limited extent.

These circumstances have so far prevented efficient recycling of a plurality of starting materials for use as a marketable basic product and further processing thereof to an end product.

DESCRIPTION OF THE INVENTION

The invention provides a method that enables the production of basic products from ash, which have a defined particle size and a high reactivity and which can therefore be integrated in industrial processes, without requiring a high amount of energy that makes the use uneconomic.

The present invention is based on the idea of "non-contact" milling. In particular, in the method according to the invention, the individual particles of the starting material are disintegrated, which enables a significantly higher surface activity while the energy input is reduced at the same time. Moreover, it is possible with non-contact milling machines to work in both dry as well as wet processes. The dry process provides the advantage in this regard of being able to forgo to a large extent subsequent drying processes and the obtained basic products can essentially be used directly e.g. for ground stabilization. In the non-contact milling process, it is assumed that water is present in the individual particles, which assumes the gaseous state due to high-frequency impulses (pressure waves) and contributes to the disintegration of the particles. It is further assumed that the particles themselves are excited and resonated by the pressure waves and subsequently burst.

Through intensive studies, the inventors have developed a method that is suited for the energy-efficient production of reactive basic products having a defined particle size.

The method comprises the provision of ash as starting material in particle form, crushing the particles of the starting material by pressure waves and the in situ separation of at least two fractions with different average particle sizes, the average particle size for dry products being determined according to ISO 13320 and the average particle size for wet products being determined according to the sedimentation method using x-ray absorption of a usually aqueous slurry containing the product, which is usually set to a measurable consistency by dilution with ethanol to prevent the dissolution of small particles. Typically, an average density of 3.0 $g/cm^3$ is used for ash, and for the liquid phase owing to the strong dilution the data of ethanol (density 0.7764 $g/cm^3$, viscosity 0.9144 mPa·s) are used.

The method will be described in more detail below.

Within the scope of this invention, reactivity is understood as the ability of a substance to enter a chemical reaction or a chemical/physical bond at its surface with the medium in which it is located. The larger the reactive surface, the greater the reactivity of a substance.

Within the terms of the present invention, reverse reaction is understood as a process, in which a substance loses the state brought about by the milling process directly after the milling process. In a reverse reaction, surfaces generated by the milling process for instance can lose their activity e.g. by reaction with the milling medium or by repeated formation of agglomerate (reagglomeration).

In the method according to the invention, the starting materials are provided in an aqueous solution, e.g. as suspension, dispersion or emulsion, or in the dry state, with the possibilities described in FIG. 2 e.g. to regulate the pressure, the temperature or the dry content of the starting materials and to add additives such as carbon dioxide or reagents to the starting materials.

Preferably, provision is in the dry state, with the setting of the temperature and/or the dry content taking place e.g. by circulation of the starting material by means of a blower. For this purpose, the starting materials are provided in air or an air/gas atmosphere, $CO_2$-containing gases being preferably used.

The starting materials are all particulate ashes, in particular crystalline, particulate ashes, the method according to the invention being suited in particular for paper ash and mixtures of ashes and paper ashes.

The ashes comprise all types of incineration ashes and industrial ashes, particularly preferred ashes being such ashes which have a high content of CaO, MgO, $Al_2O_3$, $Na_2O$ such as e.g. paper ashes or wood ash with a low inert content (e.g. $SiO_2$) and/or a low heavy metal content. According to the invention, the paper ashes comprise ashes from the recycling of paper/paperboard and their residual substances as well as residues e.g. after thermal aftertreatment. The ashes further comprise ashes from burning processes, which developed at a temperature below or over 850° C. or at different pressures (e.g. wet oxidation). Furthermore, the ashes can be present in the dry state.

The starting materials can also be a mixture of ashes with mineral substances, inorganic and/or organic solids, as shown by way of example in FIG. 2. Inorganic substances comprise preferably calcined substances, particularly preferably marble or calcined clay. Organic substances comprise preferably pigments, fibers, plastic, rubber, beans and other solids. Mineral substances comprise preferably unburnt, burnt or sintered mineral substances, particularly preferably clay or clay-containing substances, calcium oxide, calcium hydroxide, magnesium oxide and substances containing these minerals.

The starting materials are provided in particle form, according to the invention the provision of a substance in particle form comprising a starting material in the form of a particle of any morphology. In particular, the average particle size of the starting material lies between 0.01 µm to 1 cm, preferably between 0.1 µm to 10 mm.

The crushing of the particles in the method according to the present invention is carried out in both a dry as well as a wet manner by counterrotating rotors with specific internals depending on the material to be milled. By this, high-frequency pressure waves, hereinafter also pressure impulses, (e.g. with a frequency greater than 8 kHz) are created in a high frequence pressure impulse crusher (hereinafter designated inter alia as HFPI or as HFPI crusher) with undirected pressure impulses, in a dry manner preferably under a high airflow, in a vibration-transmitting medium, which is followed by an in situ separation, as designated in FIG. 2 as "HFPI crusher with in situ separation".

In the HFPI crusher, the crushing of the particles of the starting material is carried out in a non-contact manner by pressure waves. High-frequency impact pressure fronts, e.g. with a frequency greater than 8 kHz, are understood as pressure waves or also pressure impulses. By using pressure waves, natural frequency disintegrations, crystal water disintegrations and interactive stimulation of oscillation between the particles contribute to crushing and increasing the microporosity of the material to be milled. The crushing by pressure waves takes places in a vibration-transmitting medium.

Such a non-contact milling or disintegration process is described, for instance, in DE 102 59 456 A1, in which impact pressure fronts (pressure waves) with an impulse duration of less than 10 µs and a subsequent frequency of greater than 8 kHz strike the particles. In this process, the subsequent frequency can vary. For further details, reference is made to DE 102 59 456 A1.

A further process for crushing is described, for instance, in WO 91/07223, which is preferably suited to be able to crush particles in a wet manner.

The above-stated vibration-transmitting media are liquids such as e.g. water, water-solvent mixtures, in which one or more solvents are optionally emulsified, as well as solvent mixtures of two or more solvents, mixtures of air or air/gas. Particularly preferred media are mixtures of air, air/gas and/or gas in any combination, preferred are air/gas mixtures with $CO_2$-containing gases. If $CO_2$ is contained, it is possible to protect the particles from a reverse reaction by passivation. The crushing of the starting materials is carried out preferably in the dry state and in particular under high airflow.

The execution of the HFPI crushing in the dry manner as well as in the wet manner can optionally be carried out in one step or in several steps, several steps in that the HFPI crushing is carried out in several HFPI crushers connected subsequently in a row or in a cascade.

Furthermore, additives are optionally added before, during or after the crushing, which either directly react with the particles or which protect the particles e.g. by passivation. The additives are in particular one or more gases or concentrated gases, preferably carbon dioxide containing gases, particularly preferably $CO_2$-containing waste gases and flue gases from e.g. thermal power stations, steam power stations and biogas plants. Similar to that stated above, the addition of carbon dioxide containing gases or the addition of, for instance, carbon dioxide containing gases concentrated from waste gases results in the protection of the particles from a reverse reaction. Moreover, it is advantageous in terms of environmental technology to use the waste gases and flue gases from thermal power stations, steam power stations and biogas plants, which would otherwise have to be elaborately purified, for this purpose.

If the crushing is carried out in a dry manner, preferably moist, $CO_2$-containing gas or moist, concentrated $CO_2$-containing gas are used as additives to use the high reactivity of the new surfaces and to prevent reverse reactions.

The particles crushed in the HFPI crusher can optionally be used directly for further processing in their present state or preferably in a dispersion, as designated in FIG. 2 as "for further processing".

Furthermore, in a directly subsequent step, the particles crushed in the HFPI crusher are separated in situ into at least two fractions which are different in the average particle size.

Within the scope of this invention, "in situ" is to be understood as the separation of the particles directly subsequent to the crushing. This means that there is no procedural gap between the crushing of the particles and the separation. This has in particular the advantage that the individual fractions can be directly used for further processing without further processes reducing the reactivity of the basic products.

In the dry process, the separation in an energetic process is possible without additional energy for a separate module being necessary (since it is in the same airflow). The dry HFPI process generates a high air through-put in the particle crushing. This airflow is used in situ to separate the fine particles in the subsequent separation in the cyclone (after the expansion of air/pressure removal). The airflow is subsequently recycled. In a separate module (e.g. air separator), on the other hand, the airflow required for this would have to be additionally generated.

An immediate and separate storage of the ashes and products is possible. In this case, the separation is carried out before a possible interaction (reagglomeration) after the HFPI crusher without additional filtering. A dispersant or separating agent can be added in this process as support. The cleaned product of the ash cooler filter can, depending on the requirements, be added optionally before the HFPI crusher or directly to the coarser Cinerit fraction (the term "Cinerit" will be explained later).

A further advantage is that the applied temperature can be held and, if necessary, be used for a further production (modification) step e.g. in a moist medium, without additional energy having to be supplied. Since the airflow is recycled, no (cold) fresh air has to be supplied that causes cooling of the product. Here, on the other hand, a subsequent process e.g. the in situ synthesis crushing or the alkalization with warm ash can be carried out. Cooling happens only when the ash is removed from the system (e.g. by storage in the silo).

The separation is carried out e.g. via a cyclone, preferably via a cyclone with air recycling. Optionally, e.g. additional air separators are used to enable a further separation of the particles into additional fractions.

For the in situ separation of the particles crushed in a wet manner, preferably separating units, so-called gravity separators, are used which make use of the centrifugal or gravitational forces. Examples of such separating units are hydrocyclones (cleaners), centrifuges or (upstream) classifiers.

Optionally, additives are added during the separation, which are selected from the above-stated additives according to the invention. Preferred additives are $CO_2$-containing gases or gas mixtures, preferably $CO_2$-containing waste gases or flue gases.

A concentration of $CO_2$ from flue gases and waste gases from biogas plants is preferably used for some processes ($CaCO_3$ formation).

To prevent foreign air induction, the entire system for the reproduction of the method according to the invention is closed. Pressure variations are optionally balanced by filter elements. Pressure, temperature, degree of dryness and atmosphere are optionally continuously controlled in the method according to the invention to optimize the production of the basic products.

The above-described separation is carried out preferably into a first fraction, the finest fraction, which has an average particle size in the range from 0.1 to 8 µm and a second fraction, the fine fraction, which has an average particle size in the range from 8 to 100 µm.

The average particle size for the dry particles is measured according to ISO 13320. In this case, the determination of the particle size is based on the physical principles of laser diffraction. In particular, the HELOS analyzers developed by Sympatec are used in combination with the RODOS dry dispersing unit and operated according to the manufacturer's instructions (Sympatec GmbH, Augsburg, Germany).

For the determination of the average particle size for the wet particles, the sedimentation method is employed using x-ray absorption of an aqueous slurry containing the particles, which is usually set to a measurable consistency by dilution with ethanol to prevent the dissolution of small particles. Typically, an average density of 3.0 g/cm$^3$ is used for ash, and for the liquid phase owing to the strong dilution the data of ethanol (density 0.7764 g/cm$^3$, viscosity 0.9144 mPa·s) are used. The particle sizes can be determined in particular by means of a Sedigraph 5100 of Micromeritics, U.S.A. For more detailed information, reference is made to the operator's manual (Micromeritics, Sedigraph 5100, Particle Size Analysis System, Operator's Manual v3.07, 1994).

The fractions obtained in the separation are optionally resupplied to the crushing step as often as desired, as designated in FIG. 2 as "x-fold recycling".

The thus obtained fine and finest fractions are optionally used directly as basic product in the further product production e.g. as Cinerit or Elurit (see explanations below). Here, these can be mixed e.g. with other basic products, which is preferably carried out in a dispersion and is illustrated in FIG. 2 as basic product 1+2 after the fine/finest fraction.

To indicate that the fine and finest fractions can, independent of each other, provide the respective basic product, the basic products according to the invention are respectively designated with two numbers, here "1+2".

Within the scope of this invention, Cinerit® is understood as the basic product obtained in the fine fraction; Elurit® is understood as the basic product obtained in the finest fraction. In this case, the finer fraction is separated from the coarser fraction by in situ air separation in the process without requiring additional energy in the circulating flow (same airflow).

There is also the option to unite the starting materials directly with the particles of the fine and finest fractions produced in the method according to the invention and thus to avoid the HFPI crushing with in situ separation, as designated in FIG. 2 as "avoiding HFPI". The additives such as carbon dioxide or reagents can optionally be in turn added to these united fractions, which is designated in FIG. 2 with the box "optional".

With the particles of the fine and finest fractions obtained with the above method, dispersions can be prepared in that the particles are fed into a dispersing medium preferably without induction of foreign air or foreign gas. Furthermore, separating agents can additionally be added to the obtained fractions or to the dispersions containing the particles. Optionally, these particles or the prepared dispersions can be preferably subjected to a subsequent milling process for further reduction of the particle size.

Any additives such as citric acid or potassium chloride can be added to the thus produced particles, whereby the basic products 7+8 of FIG. 2 are obtained. The basic products 7+8 can variably be mixed with other basic products or be further processed or further crushed in a subsequent step.

A possible drying of the particles produced according to the above method results in the basic product 9 of FIG. 2, which can be mixed, further processed and/or further crushed.

The basic products obtained in the method according to the invention can, independent of each other, further be mixed with each other in any ratio and in any form to produce a basic product of the method according to the invention.

The basic products shown in FIG. 2 or the mixture with any proportions thereof are further processed in a subsequent process, the subsequent process preferably comprising a further crushing of the particles. Furthermore, the basic products shown in FIG. 2 or the mixture with any proportions thereof can be used directly in the building industry for ground stabilization as substitute for burnt lime. In particular, said fine fraction is used for this.

Furthermore, the basic products according to the invention are used as alkalizing agents instead of soda lye (soda lye substitute) in e.g. deinking processes, for the alkalization of fiber and wood substances and for the stabilization of wastewater purification plants or as alkaline adsorption agent instead of lime (DE 10 2005 029 500 A1). In particular, said finest fraction is used for this.

Furthermore, the basic products obtained in the method according to the invention are used as adsorption agent, as filler, in particular as paper filler, as pigment, as plaster, in composites/synthetics, in fiber plates, as binders and/or as jointing material.

One advantage of the invention is that the production of the basic products is particularly energy-efficient. For instance, in the production of burnt lime according to conventional methods 1250 kWh/t are necessary, whereas by comparison 20 kWh/t are required for the ash product production according to the invention with a comparable calcium oxide content.

Comparable energy savings have also been achieved when substituting NaOH (93.8 kWh/t) with reactive ash from paper ash (20 kWh/t).

A particular advantage of the method according to the invention is the production of basic products with defined particle size distribution for the definition of specific properties for basic or end products e.g. the definition of the paper properties (gloss, whiteness, opacity, printability, strengths, integration of the paper structure) or the definition of the surface structure for water absorption and setting of ground materials in ground stabilization.

A further unexpected advantage of the invention is that particles with physical-chemical advantages are obtained, which cannot be obtained with conventional methods. The basic products produced by the invention have a defined formation of exterior and interior surfaces, with so-called hairline cracks being formed in the particles. Owing to these properties, the basic products produced by the invention are particularly suited to be subjected to further processing in a subsequent process, the subsequent process preferably comprising a further crushing of the particles.

In this regard, it is particularly advantageous that the produced particles have new interior surfaces due to an increase of the material diffusion by increasing the microporosity, in which water and other reactive substances such as e.g. $CO_2$ (dissolved or gaseous) can be diffused. Through processes such as hydration, carbonation, sulfation, etc. an increase in volume and interior disintegrations due to the volume pressure in the particles occur. Through these chemical reactions, an additional particle crushing of the starting material takes place.

It is furthermore advantageous that the basic products produced according to the invention e.g. have an increased specific surface (BET surface area) as compared to the conventional method of wet milling. These particles produced according to the method according to the invention therefore have a significantly increased reactivity, exhibit an increased catalytic exchange capacity as well as an increased capacity with regard to the acid and the acid neutralization and are thus particles of higher quality.

A further advantage of this invention is that even in a dry process an agglomerate or aggregate formation, which occurs in the crushing according to conventional methods with grinding units such as ball mills, does not take place or only takes place to a very minor extent. This provides technical advantages in the recycling process, since e.g. there are almost no machine downtimes which are caused by deposition or by abrasive wear of the milling tool.

Hereinbelow, unrestrictive examples are provided, which serve as clarification of the invention.

EMBODIMENT EXAMPLES

Ash

Figure 1:
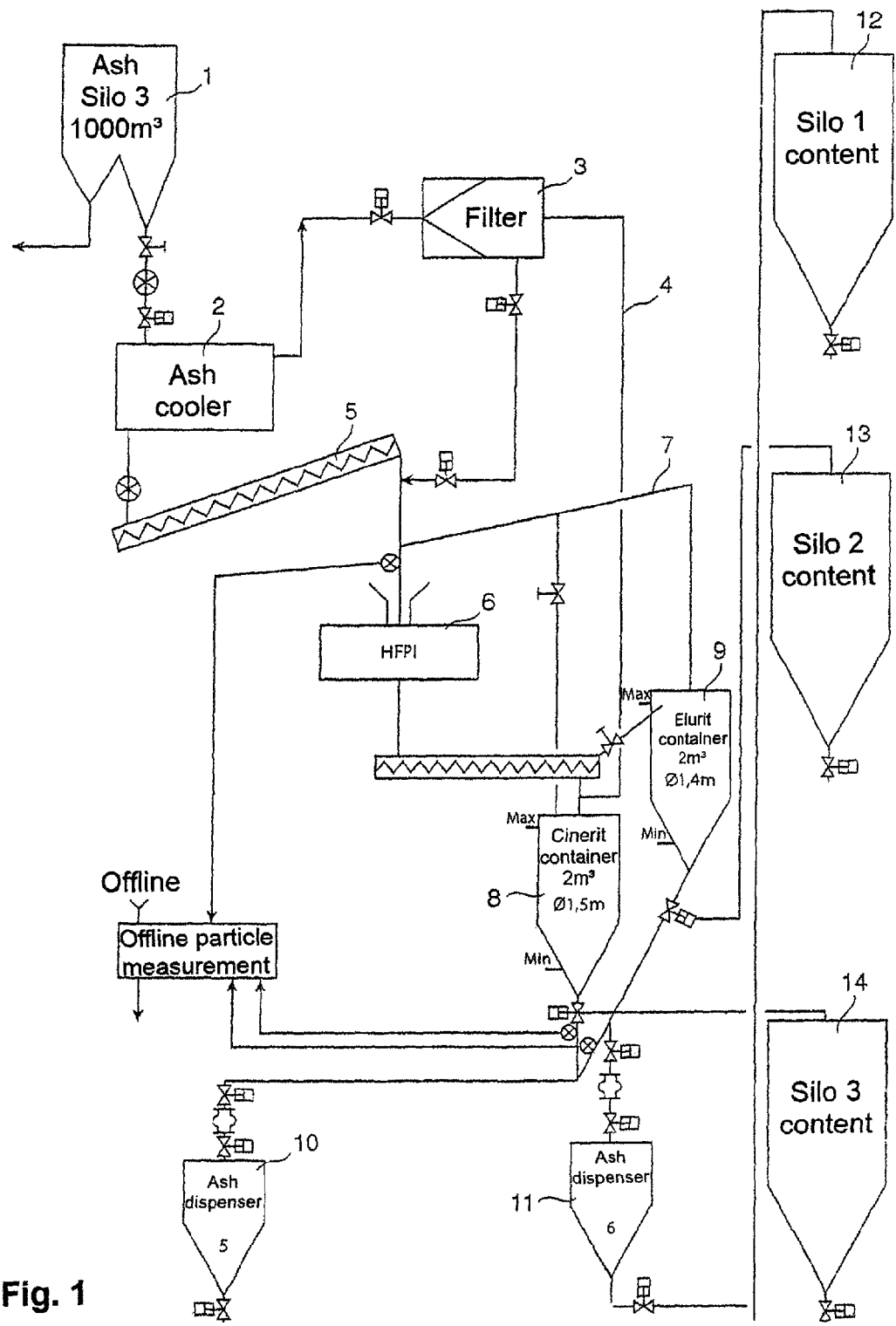
FIG. 1 shows a test set-up of a plant for carrying out the method according to the invention.
Figure 2:
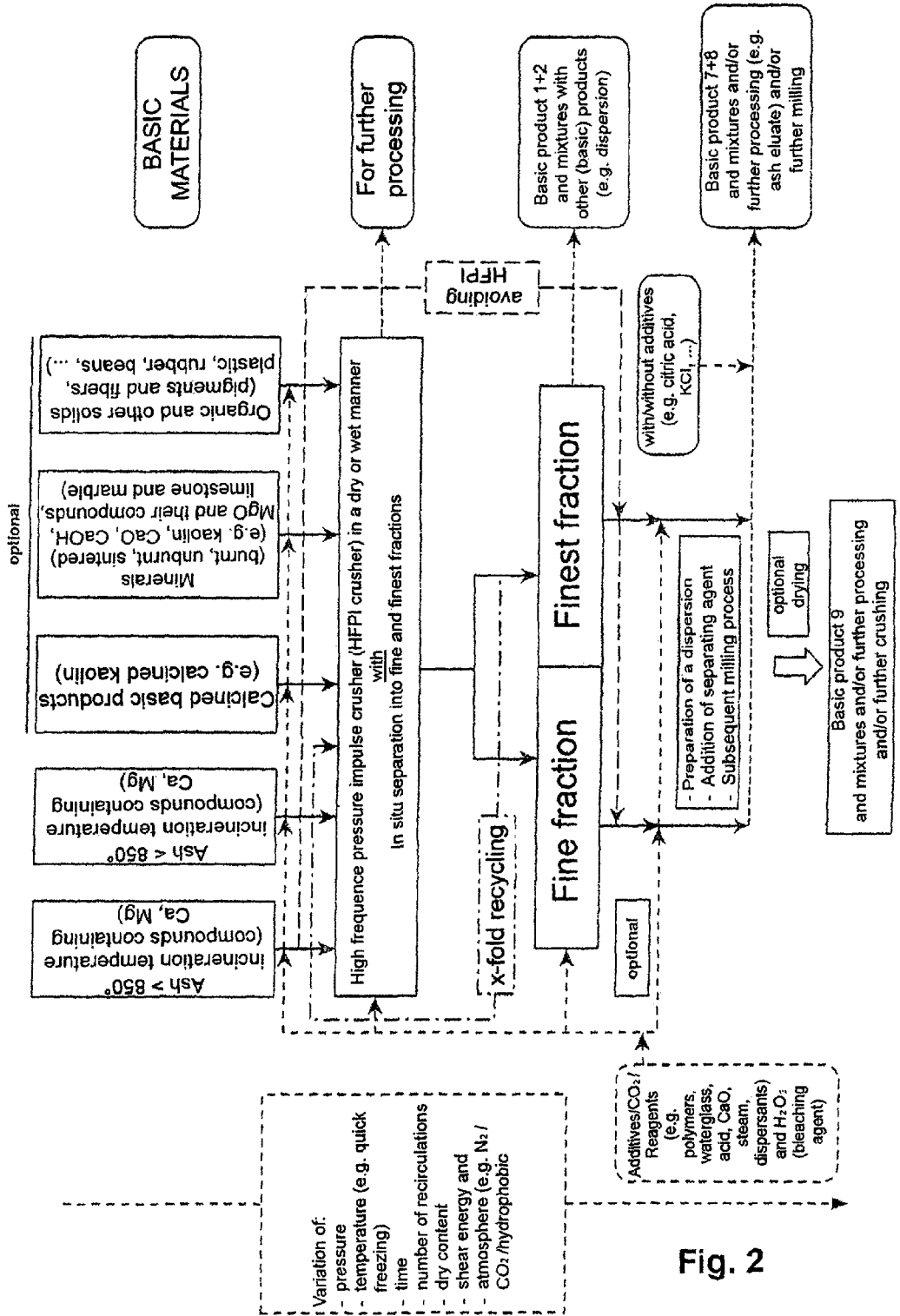
FIG. 2 schematically shows possible workflows of the method according to the invention for the production of basic products.

The ash, on which the following examples are based, is obtained in a 56 MW thermal power station with a fluidized-bed boiler by incineration of fiber residues (fibers yielded as loss in the waste paper recycling system) as well as waste wood and sawdust. Furthermore, removed color particles and sorted-out synthetic materials from the waste paper are contained in the material to be incinerated. The ash essentially consists of approximately 48% CaO (free lime content approximately 8%), 5% MgO, 14% $Al_2O_3$, 1% $Na_2O$, 0.2% $K_2O$, 35% $SiO_2$ and the typical minor components of ash.

Example of the Method According to the Invention

The starting material ash is supplied from a silo (1) as starting material for temperature setting in an ash cooler. The ash is circulated with a blower in the ash cooler (2) and, if necessary, the temperature is reduced from approximately 140° C. to 70° C. by means of cooling water. The thus whirled up and cooled ash is supplied via a rotary feeder into the tube chain conveyor (5). The exhaust air is purified of finest particles via a reverse flow cartridge filter (3). The finest particles are supplied to the finest fraction (8), which is downstream of the crushing, via a valve.

The supply to the HFPI crusher (6) is carried out consistently via chain conveyor (5). The entire system is closed, pressure variations are compensated by a filter element at this point.

The crushing in the HFPI crusher (6) is carried out by means of counterrotating rotors with specific internals adapted according to the required basic or end product in an air atmosphere under high airflow.

The ash crushed in a non-contact manner is separated in a subsequent step into a fine fraction (8) (Cinerit) and a finest fraction (9) (Elurit) without a procedural gap, i.e. in situ. The separation into fine fraction and finest fraction is carried out via a cyclone. In the finest fraction (9), there is an air recycling (7) to the HFPI crusher. In the recirculation line, a further filter element is located which can be optionally connected to the existing exhaust air filter system and serves for pressure compensation.

Ash, which corresponds to the properties of the fine fraction and is yielded in a filter (3) during ash cooling, can optionally be directly supplied to the Cinerit container (8). Subsequent to the above-described process, it is possible to supply the separated fractions to a silo (12) via an ash dispenser (10) and (11) and store these temporarily for further use. There is also the option to fill the fine fraction (Cinerit) and the finest fraction (Elurit) in separate silos (13) or (14) (Cinerit/Elurit). For recycling in industrial processes, ash eluates can be produced with the individual fine and finest fractions in that the particles are suspended with water and dispersed in a dissolution plant.

Example 1

Ash Recycling According to the Method According to the Invention

Recycling the ash according to the above-described example of the method according to the invention.

Comparative Example 1

Ash Recycling According to Conventional Methods

Recycling the ash according to the conventional wet milling of coarse boiler ash or $Ca(OH)_2$ by means of a wet ball mill or disk (vibration) mill (MW 2 μm particle size).

Comparison of the Required Energy

The energy required to crush 1 ton of ash according to Example 1 and according to Comparative Example 1 is given in Table 1.

TABLE 1

|  | Required Energy (90% < 2 m) kWh/t Ash |
| --- | --- |
| Example 1 | 10 |
| Comparative Example 1 | 100 |

Properties of the Produced Basic Products

The properties of the produced basic products were determined as follows:

The degree of whiteness was determined after reaction of the product with air and the $CO_2$ contained therein. The optical properties of the degree of whiteness R457 were determined by means of an L&W Elrepho/pulsed xenon lamp with D65 diffuse standard illuminant and 10° viewing.

Determination of the specific surface (BET) of solids according to DIN 66132, according to BET method, DIN EN ISO 18757 (previously: DIN EN 725-6) with AREA-meter II (Ströhlein Instruments) according to Haul and Dümbgen.

Cation exchange capacity according to DIN 19684 Part 8.

Acid capacity according to DIN 38409-7.

Acid neutralization capacity according to the Directive LAGA EW 98 2002 [LAGA: Bund-Länder-Arbeitsgemeinschaft Abfall=joint working group of Federation and States on waste; EW 98 relates to aqueous eluates]—trough method.

The properties of the basic products from Example 1 as compared to the basic product produced according to Comparative Example 1 are listed in Table 2.

TABLE 2

|  | Example 1 | | Comparative Example 1 |
| --- | --- | --- | --- |
|  | Fine fraction | Finest fraction |  |
| BET [m2/g] | 6.6 | 8.2 | 4.4 |
| Cation exchange capacity [mmol/kg] | 2800 | 3100 | 2000 |
| Acid neutralization capacity [mmol/l] | 21000 | 24000 | 16500 |
| Acid capacity [mmol/l] | 42.2 | 44 | 36.6 |
| Degree of whiteness D65/10° [%] | 72.5 | 72.5 | 70.1 |

It is apparent from Table 2 that due to the HFPI crushing starting from the starting material a significant increase of the specific surface and thus also an increase of the specific reactive surface is achieved, which is apparent here from the exchange capacity, the acid neutralization capacity, the acid capacity and the increased degree of whiteness.

Examples of Use

Use of Ash as Soda Lye Substitute

The eluate produced in Example 1 is subsequently suspended with water and dispersed in a dissolution plant. The eluate is used as an alkaline component produced according to the method according to the invention and can replace the use of soda lye e.g. in the paper and wood production.

Use of Fine Particle Ash for Use in Ground Stabilization

The prerequisite for the use of ash in ground stabilization is a defined degree of particle size, which can only be achieved with the method according to the invention, but not with conventional methods such as ball mills. The finest fraction (14) is used for this.

In addition to the method described in Example 1, a mixing screw is used for manipulation for a binder adjusted to the respective ground material.

The ash product according to the invention replaces burnt lime (CaO) here in ground stabilization, as a result of which it is possible to reduce the amount of energy required from conventionally 1250 kWh/t to only 20 kWh/t according to the invention.

Use of Ash as Filler in Paper Production

The ash according to the invention can be used directly as filler in paper production by direct substitution of chalk/kaolin or indirectly by substitution of burnt lime in PCC processes (precipitated calcium carbonate).

Use of Ash in a Further Process

The ash according to the invention is particularly suited for use in a further process, which comprises an in situ modification and, simultaneously, setting significantly lower sizes.

The invention claimed is:

1. A method for producing basic products from ash, comprising the following steps:
   i. providing a device structured to crush and to separate particles of a starting material;
   ii. providing ash as starting material in particle form;
   iii. crushing the particles of the starting material by pressure waves; and
   iv. directly subsequent to the crushing, separating the crushed particles into at least two fractions with different average particle sizes so that there is no procedural gap between the crushing of the particles and the separation and so that the crushing and the separating of the crushed particles occur in the same device,
   wherein the step of crushing the particles of the starting material by pressure waves is carried out using a high frequency pressure impulse (HFPI) crusher, and
   wherein the high frequency pressure impulse (HFPI) crusher is a HFPI crusher with in situ separator.

2. The method according to claim 1, wherein the crushing is carried out in a dry state in air or in an air/gas mixture, wherein an airflow generated in the particle crushing is used in situ to separate the fine particles in a subsequent separation in a cyclone.

3. The method according to claim 1, wherein the produced basic product has an average particle size of 0.1 to 100 μm.

4. The method according to claim 1, wherein at least one of the two fractions of the basic product is directly used as product for ground stabilization as soda lye substitute, as adsorption agent and/or as filler.

5. The method according to claim 1, in which due to the separation in step (iii) at least a first fraction with an average particle size in the range from 0.1 to 8 μm and a second fraction with an average particle size in the range from 8 to 100 μm result.

6. The method according to claim 5, in which each individual fraction is independently further used directly as basic product and/or is subjected to a further process.

7. The method according to claim 6, in which the further process comprises a further modification of the particle size.

8. The method according to claim 1, in which one or more solid, liquid or gaseous additives are added before, during or after the crushing of the particles of the starting material (step (iii)) and/or before, during or after the separation of the fractions (step (iv)).

9. The method according to claim 8, in which one or more carbon dioxide containing gases and/or concentrated carbon dioxide containing gases are used as additives.

10. The method of claim 1, wherein for an in situ separation of particles crushed in a wet manner, gravity separators are used which make use of centrifugal or gravitational forces.

11. The method of claim 1, wherein the ash is paper ash.

12. The method of claim 1, wherein the high frequency pressure impulse (HFPI) crusher is operated at a frequency greater than 8 kHz.

* * * * *